United States Patent
Xie et al.

(10) Patent No.: US 10,475,229 B2
(45) Date of Patent: Nov. 12, 2019

(54) INFORMATION PROCESSING APPARATUS AND INFORMATION PROCESSING METHOD

(71) Applicant: SONY CORPORATION, Tokyo (JP)

(72) Inventors: Wuyuan Xie, Beijing (CN); Lei Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 15/841,460

(22) Filed: Dec. 14, 2017

(65) Prior Publication Data
US 2018/0253885 A1  Sep. 6, 2018

(30) Foreign Application Priority Data

Mar. 3, 2017 (CN) .......................... 2017 1 0123759

(51) Int. Cl.
*G06T 15/04* (2011.01)
*G06T 19/20* (2011.01)
*G06T 5/00* (2006.01)
*G06T 7/40* (2017.01)

(52) U.S. Cl.
CPC .............. *G06T 15/04* (2013.01); *G06T 5/003* (2013.01); *G06T 7/40* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2002/0169586 A1* | 11/2002 | Rankin, II | G06T 7/0004 703/1 |
| 2012/0081357 A1* | 4/2012 | Habbecke | G06T 17/00 345/419 |
| 2013/0127860 A1* | 5/2013 | Hadap | G06T 7/507 345/426 |

OTHER PUBLICATIONS

Daoshan OuYang, Hsi-Yung Feng, "On the normal vector estimation for point cloud data from smooth surfaces", Computer-Aided Design 37 (2005) 1071-1079, www.elsevier.com/locate/cad (Year: 2005).*

* cited by examiner

*Primary Examiner* — Tize Ma
(74) *Attorney, Agent, or Firm* — Xsensus LLP (57) ABSTRACT

The disclosure relates to an information processing apparatus and an information processing method. The information processing apparatus includes a processing circuitry configured to: obtain a normal map of an object based on depth data of the object; determine a normal angle of a pixel in the normal map, wherein the normal angle being an angle between a normal vector of the pixel and an average normal vector of a patch with a predetermined size centered on the pixel; identify, in the normal map, a patch in which normal angles of pixels conform to a predetermined distribution pattern; and adjust the normal angle of a pixel in the identified patch to obtain the optimized normal map.

15 Claims, 11 Drawing Sheets

INFORMATION PROCESSING APPARATUS AND INFORMATION PROCESSING METHOD

TECHNICAL FIELD

The present disclosure generally relates to information processing, and in particular to information processing apparatus and information processing method for texture enhancement of three-dimensional (3D) data.

BACKGROUND

Existing methods for 3D surface detail enhancement include methods for rendering shading in computer graphics and methods for enhancing depth resolution in the field of 3D reconstruction. In computer graphics, in order to render an input 3D model realistically, some methods introduce a complex illumination model for a surface with known normal map, and adjust the reflection on surface to make the captured pixel values rendering rich texture. These methods only change the pixel values in 2D images, which makes its color texture to be enhanced instead of actually changing the 3D surface detail.

SUMMARY

A brief overview of embodiments of the present disclosure is given below so as to provide a basic understanding of certain aspects of the present disclosure. It is to be understood that the following summary is not an exhaustive overview of the present disclosure. It is neither intended to determine the critical or important part of the present disclosure, nor intended to limit the scope of the present disclosure. The purpose thereof is merely to give some concepts in a simplified form as a prelude to the more detailed description of the later discussion.

An information processing apparatus is provided according to an embodiment. The apparatus includes a processing circuitry configured to: obtain a normal map of an object based on depth data of the object; determine a normal angle of a pixel in the normal map, wherein the normal angle being an angle between a normal vector of the pixel and an average normal vector of a patch of a predetermined size centered on the pixel; identify, in the normal map, a patch in which the normal angles of pixels conform to a predetermined distribution pattern; and adjust the normal angle of a pixel in the identified patch to obtain an optimized normal map.

An information processing method is provided according to another embodiment. The method includes: obtaining a normal map of an object based on depth data of the object; determining a normal angle of a pixel in the normal map, wherein the normal angle being an angle between a normal vector of the pixel and an average normal vector of a patch of a predetermined size centered on the pixel; identifying, in the normal map, a patch in which the normal angles of pixels conform to a predetermined distribution pattern; and adjusting the normal angle of a pixel in the identified patch to obtain an optimized normal map.

With the information processing apparatus and the information processing method according to the embodiments of the present disclosure, the micro geometry structure on surface (i.e. 3D texture) can be effectively enhanced.

BRIEF DESCRIPTION OF THE DRAWINGS

The present disclosure may be better understood with reference to the following description given in conjunction with the drawings in which same or similar reference numerals are used throughout the drawings to refer to the same or like parts. The drawings, together with the following detailed description, are included in this specification and form a part of this specification, and are used to further illustrate preferred embodiments of the present disclosure and to explain the principles and advantages of the present disclosure. In the drawings.

DETAILED DESCRIPTION OF THE EMBODIMENTS

Hereinafter, embodiments of the present disclosure will be described with reference to the drawings. Elements and features described in one of the drawings or embodiments of the present disclosure may be combined with elements and features shown in one or more other drawings or embodiments. It should be noted that, for the purpose of clarity, indication and description of components and processing irrelevant to the present disclosure and known by those skilled in the art are omitted in the drawings and the explanation.

Figure 1:
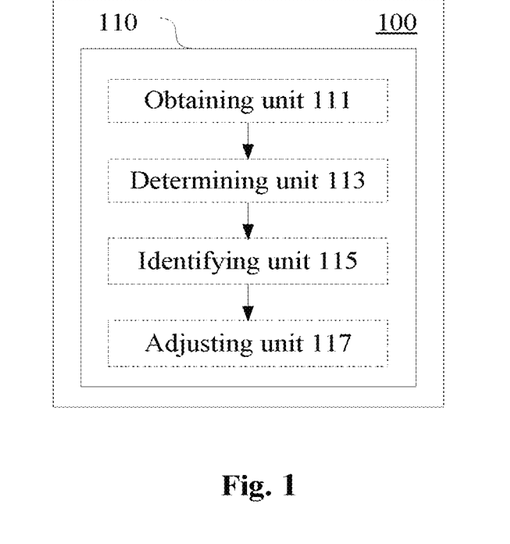
FIG. 1 is a block diagram illustrating a configuration example of an information processing apparatus according to an embodiment of the present disclosure.

FIG. 1 illustrates a configuration example of an information processing apparatus 100 according to an embodiment of the present disclosure. For example, the information processing apparatus may be implemented as a personal computer (such as a desktop computer and a laptop computer), a work station, a gaming machine (such as a somatosensory gaming machine), a television, a mobile terminal (such as a smart phone, a tablet computer and a portable game terminal) or an image capturing device (such as a camera and a monitor). However, instead of being limited to be applied to the aspects enumerated in the above, embodiments of the present disclosure can be applied to any apparatus capable of acquiring a depth image or an apparatus communicatively-coupled to or electrically-coupled to an apparatus capable of acquiring a depth image to process a depth image.

As shown in FIG. 1, the information processing apparatus 100 according to the present embodiment includes a processing circuitry 110. The processing circuitry 110 may be implemented as, for example, a particular chip, a chipset or a central processing unit (CPU), etc.

The processing circuitry 110 includes an obtaining unit 111, a determining unit 113, an identifying unit 115 and an adjusting unit 117. It should be noted that, although the obtaining unit 111, the determining unit 113, the identifying unit 115 and the adjusting unit 117 are shown in form of functional blocks in FIG. 1, it should be understood that functions thereof may also be realized by the processing circuitry 110 as a whole and are not necessarily realized by discrete actual components of the processing circuitry 110. In addition, although the processing circuitry 110 is shown by one block in FIG. 1, the information processing apparatus 100 may include multiple processing circuitries, and the functions of the obtaining unit 111, the determining unit 113, the identifying unit 115 and the adjusting unit 117 may be distributed to the multiple processing circuitries, so that the multiple processing circuitries perform these functions cooperatively.

The obtaining unit 111 is configured to obtain a normal map of an object based on depth data of the object.

The information processing apparatus according to the present embodiment takes, for example, low-quality depth data as an input, and is used for generating high-quality depth data with richer surface details. The depth data may include, for example, mesh data, point cloud, a depth map, or a normal map itself. However, the depth data is not limited thereto, and may include any data that can be converted into a normal vector. The depth data may be acquired, for example, by a depth camera or real-time 3D reconstruction hardware, or may be acquired from a virtual 3D model. In addition, the above-mentioned "low quality" means that the depth data has quality deterioration in a certain aspect, such as blurring or having a hole, which makes it difficult to observe the surface detail or texture.

The depth data such as mesh data, a point cloud and a depth map, may be converted into a normal map by using a variety of known methods in the art. The normal map can be obtained directly in a case that the depth data is the normal map itself.

The determining unit 113 is configured to determine a normal angle of a pixel in the normal map obtained by the obtaining unit 111. The "normal angle" of a pixel refers to an angle between a normal vector of the pixel and an average normal vector of a patch with a predetermined size centered on the pixel.

The surface texture is generally determined by a high-frequency component in a normal field. After the input depth data is converted into the normal vector, the normal angle is calculated by using a high-frequency normal vector and a low-frequency vector. The two-dimensional angle field allows to modify the surface detail while maintaining a shape, and a definition of surface texture is proposed in the angle space.

In addition, the patch with the predetermined size may include any predetermined number of pixels, for example, 3×3 pixels or 5×5 pixels.

Next, a manner for determining the normal angle is described more specifically in conjunction with a specific example.

An input depth map is indicated with D, and a corresponding normal map N may be calculated based on the following Equation (1):

$$N = [G_x, G_y, -1]^T \qquad \text{Equation (1)}$$

where $G_x = \partial D/\partial x$ and $G_y = \partial D/\partial y$ are gradients of D along direction x and direction y, respectively. Since a two-dimensional angle filed is to be obtained, the gradient in z direction is set as a constant value −1. As described above, a shape of an object is defined by a low-frequency component of the normal map, and it is realized by the inventor of the present disclosure that the surface detail may be determined by a relationship between normal vectors in a local patch. Further, the local relationship may be measured by the normal angle calculated as follows.

For a pixel $\langle r,c \rangle$, a normal angle $\theta_{r,c}$ is:

$$\theta_{r,c} = \measuredangle(n_{r,c}, \bar{n}_{r,c}^w) \qquad \text{Equation (2)}$$

$$\bar{n}_{r,c}^w = \frac{\sum_i^w \sum_j^w n_{i,j}}{w^2} \qquad \text{Equation (3)}$$

where $n_{r,c}$ is a normal vector at the pixel $\langle r,c \rangle$, and $\bar{n}_{r,c}^w$ is an average normal vector of a patch with a size of w×w centered on the pixel $\langle r,c \rangle$.

Another equivalent representation of $\theta_{r,c}$ may be written as a difference between two vectors as follows:

$$\Delta n_{r,c} = n_{r,c} - \bar{n}_{r,c}^w \qquad \text{Equation (4)}$$

where $n_{r,c}$ and $\bar{n}_{r,c}^w$ are normalized vectors having Euclidean norms equal to 1.

Figure 10A:
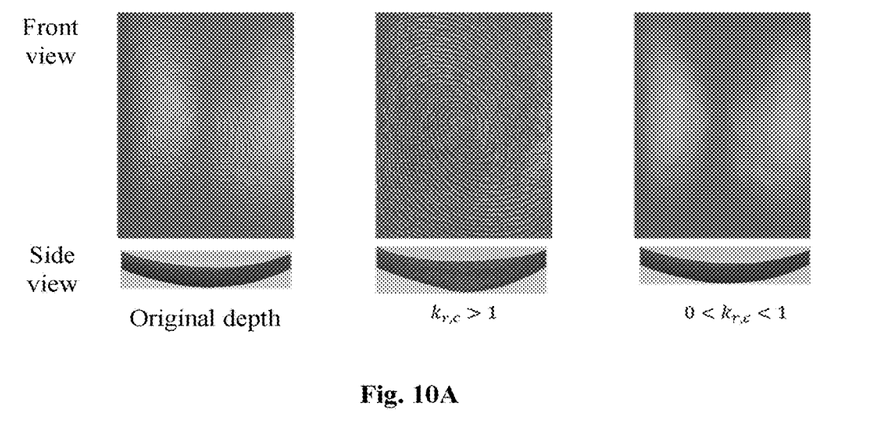
FIG. 10A and FIG. 10B are schematic diagrams illustrating a relationship between a surface smoothness and a normal angle.
Figure 10B:
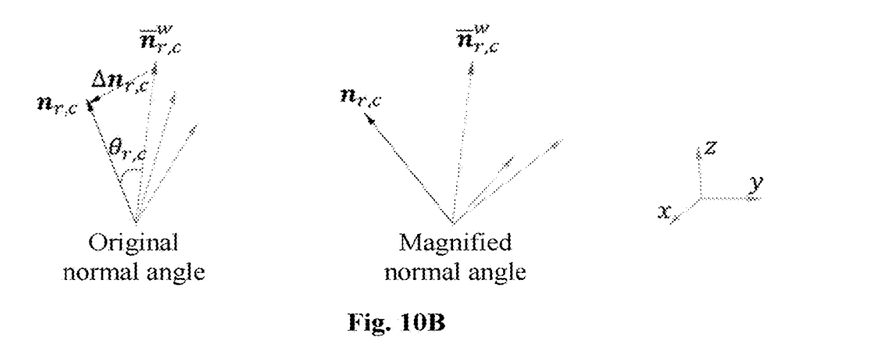

FIG. 10B diagrams a relationship of $\theta_{r,c}$, $n_{r,c}$, $\bar{n}_{r,c}^w$ and $\Delta n_{r,c}$.

In addition, surface details of a given 3D object may be sharpened by increasing a normal angle, and may be reduced by decreasing the normal angle. The normal vector obtained by changing the normal angle is:

$$\tilde{n}_{r,c} = \bar{n}_{r,c}^w + k_{r,c} \cdot \Delta n_{r,c} \qquad \text{Equation (5)}$$

where $k_{r,c}$ is a sharpening weight, $k_{r,c} > 1$ is used to sharpen the texture, and $0 < k_{r,c} < 1$ is used to smooth the texture, as shown in FIG. 10A. This is because, Equation (5) is actually an affine transformation operation performed on the high-frequency normal vector $n_{r,c}$ with reference to the low-frequency normal vector $\bar{n}_{r,c}^w$, which means that the surface details defined by $n_{r,c}$ is changed while the shape determined by $\bar{n}_{r,c}^w$ is maintained.

In the above, the normal angle and a relationship between the normal angle and the surface detail are described. Next, the information processing apparatus according to the embodiment of the present disclosure is further described with reference to FIG. 1.

The identifying unit 115 is configured to identify, in the normal map, a patch in which the normal angles of pixels conform to a predetermined distribution pattern.

Still referring to the example described above, an intuitive idea of sharpening a surface texture is to design a sharpening filter based on the previous Equation (5) and apply the filter to normal vectors pixel by pixel. However, if a same sharpening weight $k_{r,c}$ is applied to each pixel to achieve a consistent sharpening to the entire surface, then it is possible to make some parts of the surface over-sharpened while some parts of the surface are still blurred. It is realized by the inventor of the present disclosure that how to select the sharpening weights $k_{r,c}$ is a critical step in determining the texture quality. In order to obtain a high-quality enhancement result, some patches require a larger $k_{r,c}$, while others does not.

A purpose of the above identifying operation performed by the identifying unit 115 is to find a pixel patch meeting a specific requirement, so that the sharpening processing can be performed only on the specific pixel patch.

Specifically, the predetermined distribution pattern may include, for example: values of normal angles of pixels arranged along a predetermined direction in a patch present a single-peak distribution. Specifically, the predetermined direction may include a horizontal direction, a vertical direction or a diagonal direction. Further, it may be required that a peak of the single-peak distribution is at the center of the patch.

Figure 11:
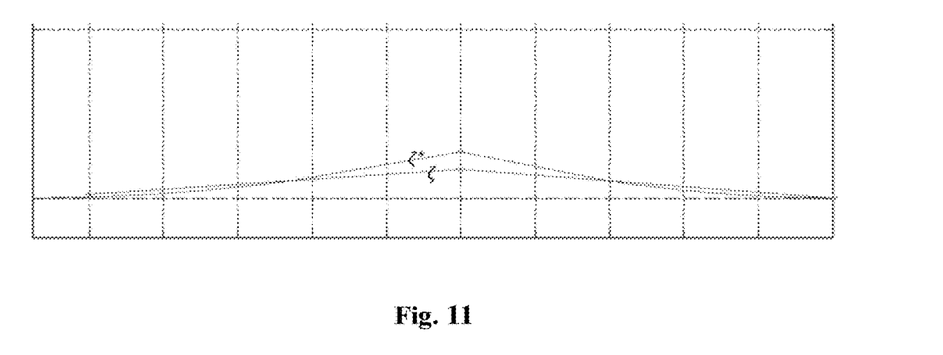
FIG. 11 illustrates an example of an angle profile curve.

According to the embodiment of the present disclosure, specific patches in a normal map are identified based on the normal angles, hence the sharpening process can be performed targetedly on the specific patches. The specific patches include patches contributing to affecting the surface detail. Moreover, it is realized by the inventor that this contribution can be measured by a sharpness of an "angle profile" obtained by a fitting on normal angles. The sharper the profile is, the clearer the surface detail is. As shown in FIG. 11, for a normal patch $p_{r,c}$ with a size of $w_p \times w_p$ centered on the pixel $\langle r,c \rangle$ a distribution curve of values of all the normal angles on the patch may be defined as a normal angle profile $\zeta_{r,c}$:

$$\zeta_{r,c} = f_{r,c}(\theta_{i,j} | \langle i,j \rangle \in p_{r,c}) \quad \text{Equation (6)}$$

where $f_{r,c}$ is a curve fitting function applied to $(\theta_{i,j} | \langle i,j \rangle \in p_{r,c})$.

Here, the normal map and the size of a detection patch $w_p$ are given, the texture can be detected pixel by pixel as follows: for the pixel $\langle r,c \rangle$, if its normal angle profile $\zeta_{r,c}$ is a single-peak curve, a corresponding normal map patch $p_{r,c}$ contains a texture feature.

It is to be understood that the embodiments of the present disclosure are not limited to the specific details in the above examples.

The adjusting unit 117 is configured to adjust the normal angle of a pixel in the identified patch to obtain an optimized normal map.

The adjusting unit 117 may adjust the normal angle in various manners. For example, a normal angle of a corresponding pixel (such as a central pixel of a patch of 3×3 pixels) may be increased simply by a constant amount or a specific ratio, thereby enhancing the surface.

Further, according to a preferred embodiment, the adjusting unit 117 may be configured to adjust normal angles of pixels arranged along a predetermined direction while maintaining the area under curve of the single-peak distribution identified by the identifying unit 115. For example, referring to FIG. 11, as compared with a normal angle profile $\zeta$ before the adjustment, the adjusted normal angle profile $\zeta'$ is raised at a position near the peak, and is lowered at a position near the edges, hence areas under curves of the two profiles are kept the same (although FIG. 11 does not necessarily accurately reflect a quantitative relationship between the areas). With the configuration, the surface detail can be enhanced with an overall normal vector of the patch kept stable.

In addition, according to an embodiment, an adjustment amount for the normal angle may be determined based on training data. The adjustment performed by the adjusting unit 117 may include: determining a sharpening factor based on a training image set containing high-definition depth images and corresponding blurred depth images; and adjusting the normal angle based on the determined sharpening factor.

The high-definition depth images and the corresponding blurred depth images may be obtained in the following way: for a given low-resolution depth image and a corresponding first high-resolution depth image, converting, by interpolation, the low-resolution depth image into a second high-resolution depth image having a resolution same as the first high-resolution depth image; and taking the first high-resolution depth image and the second high-resolution depth image as the high-definition depth image and the blurred depth image, respectively.

In particular, in a case that the predetermined distribution pattern includes that values of the normal angles of pixels arranged along a predetermined direction in a patch present a single-peak distribution, according to an embodiment, a scaling factor for a height-width ratio of the single-peak distribution can be determined as the above sharpening factor.

Further, according to an embodiment, the determination of the sharpening factor may include: determining, for the identified patch, a similar patch in a normal map of the blurred depth image; and determining the sharpening factor based on a distribution of normal angles of the similar patch and a distribution of normal angles of a corresponding patch in a normal map of the high-definition depth image.

Next, an exemplary manner for determining the sharpening factor based on the training data is described with reference to FIG. 9.

Figure 9:
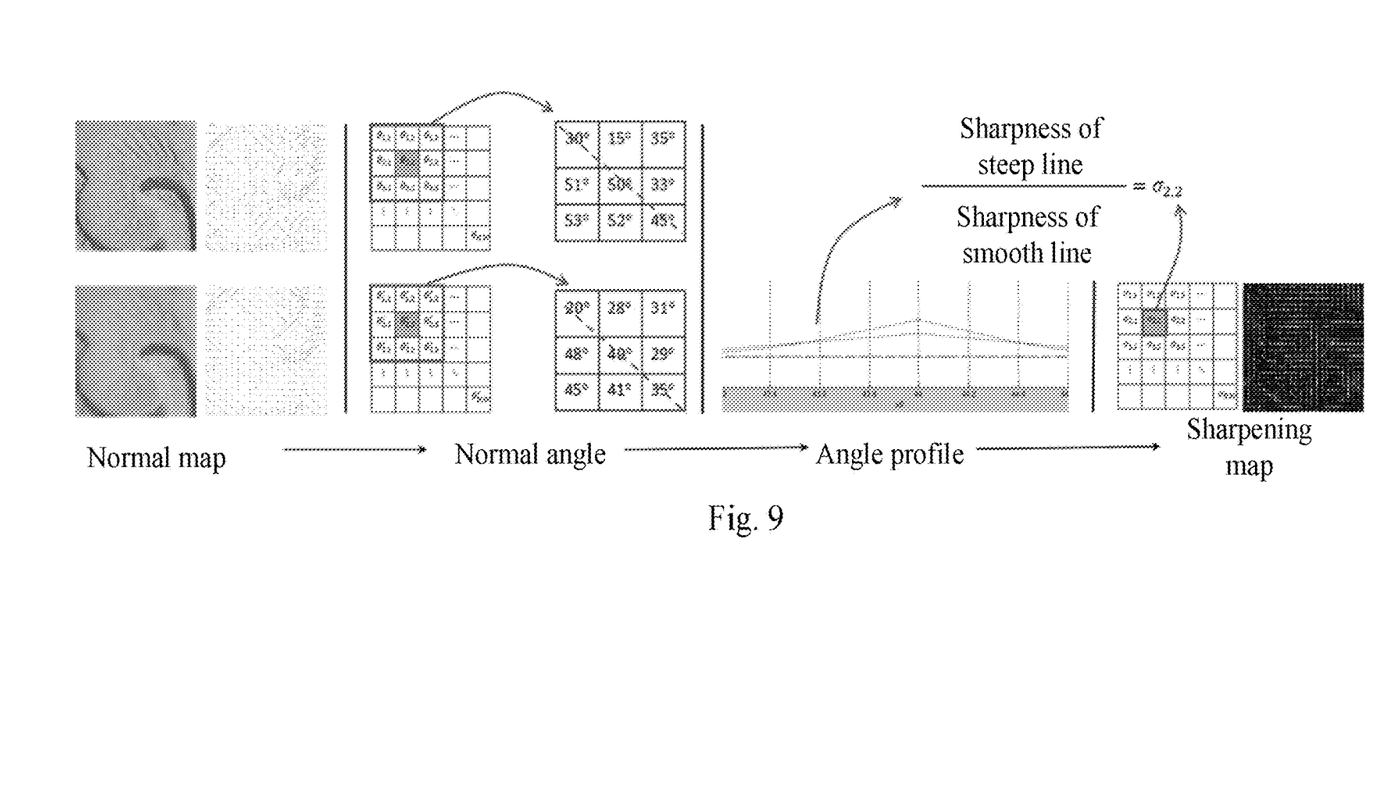
FIG. 9 is a schematic diagram illustrating an exemplary manner for determining a sharpening map based on training data.

In FIG. 9, a high-quality normal map (top) and a low-quality normal map (bottom) are respectively shown in forms of intensity graphs and vectors on the left side, corresponding normal angles are shown on the right side of the respective normal maps, in which a pixel patch of 3×3 pixels centered on a pixel (2, 2) is shown as an example, an angle profile corresponding to the pixel (2, 2) is shown on the right side of the normal angles, and an exemplary sharpening map is shown on the far right side of FIG. 9.

Referring to the specific example described above, a surface texture patch $p_{r,c}$ needs to have a single-peak angle profile $\zeta_{r,c}$, and a sharpness of $\zeta_{r,c}$ can be defined as:

$$o = \frac{H_\zeta}{W_\zeta} \quad \text{Equation (7)}$$

where $H_\zeta$ and $W_\zeta$ are respectively a peak height and a peak width of $\zeta_{r,c}$. Regarding a pair formed by a low-quality normal map $N_{blur}$ and a high-quality normal map $N_{clear}$ which have a same resolution, if a texture patch $p_{blur}$ is detected around a pixel $\langle r,c \rangle$ of $N_{blur}$, there necessarily be a similar texture feature $p_{clear}$ around a pixel $\langle r,c \rangle$ of $N_{clear}$. For each pair of texture patches $\langle p_{blur}, p_{clear} \rangle$, their profile sharpnesses are respectively calculated with equations (6) and (7), and are denoted by $\circ$ (for $p_{blur}$) and $\circ^*$ (for $p_{clear}$). A ratio of $\circ$ and $\circ^*$ can be calculated:

$$\sigma = \frac{o^*}{o} \quad \text{Equation (8)}$$

where σ may be referred to as a sharpness weight, and a sharpening map X is formed by each σ of the pairs of texture patches detected based on the normal map (where σ is set as 1 for a non-texture patch), i.e., $$X=\{\sigma_{i,j}\} \quad \text{Equation (9)}$$

Hence, a sharpening map X may be generated based on each pair of training normal maps $\langle N_{blur}, N_{clear}\rangle$ ($N_{blur}$, $N_{clear}$ and X have the same resolution).

In reverse, if a testing low-quality normal map $N_{test}$ is given and it is assumed that its sharpening map $X^*=\{\sigma^*_{i,j}\}$ given, the texture may be enhanced by sharpening an angle profile.

As an example, the texture enhancement process may be implemented as the following first algorithm:

a texture patch is detected from $N_{test}$ (with equation (6)), and an angle profile ζ and a sharpness o are calculated (with equations (6) and (7)).

the angle profile ζ is sharpened by applying the sharpening map $X^*=\{\sigma^*_{i,j}\}$, $$\zeta^*=\text{sharp}(\zeta,\sigma),\ \text{s.t.}\ \Omega \quad \text{Equation (10)}$$

where σ is a sharpening weight in the sharpening map $X^*=\{\sigma^*_{i,j}\}$, and Ω is an area surrounded by ζ under Euler coordinates, which should be fixed during the sharpening. As described above, in view of ζ being a single-peak profile, ζ may be fitted into a triangular profile with a height of $H_\zeta$ and a width of $W_\zeta$, then equation (10) may be implemented as:

$$\begin{cases} \frac{1}{2}H_{\zeta^*}\cdot W_{\zeta^*} = \frac{1}{2}H_\zeta \cdot W_\zeta = \Omega \\ \frac{H_{\zeta^*}}{W_{\zeta^*}} = o^* \\ o^* = o\cdot\sigma \end{cases} \quad \text{Equation (11)}$$

After obtaining the sharpening profile ζ*, an expected normal angle $\theta^*_{r,c}$ can be estimated based on a projection of $\theta_{i,j}$ on ζ*.

$$\theta^*_{i,j}=\Pi_{\zeta^*}(\theta_{i,j}),\ \text{w.r.t.} \langle i,j\rangle \in p \quad \text{Equation (12)}$$

The projection process is described again with reference to FIG. 11. The curve ζ is an original angle profile constituted by original normal angles (equation (6)), and the curve ζ* is a sharpening angle profile corresponding to expected optimum normal angles. Hence, a projection of equation (12) is implemented as a vertical projection of the original angle values to the curve ζ* along a y-axis direction.

according to equation (4) and FIG. 10B, once the expected normal angle $\theta^*_{r,c}$ is given, a corresponding normal vector $n^*_{r,c}$ of the pixel is updated to be $$n^*_{r,c}=\Delta n^*_{r,c}+\bar{n}^w_{r,c} \quad \text{Equation (13)}$$

where $\bar{n}^{*w}_{r,c}$ is calculated from a patch with a size of w×w in the original normal map. As shown in FIG. 10B, according to the cosine theorem, $\Delta n^*_{r,c}$ may be written in a form of $\theta^*_{r,c}$:

$$\begin{cases} \|\Delta n^*_{r,c}\| = \|n^*_{r,c}\| + \|\bar{n}^w_{r,c}\| - 2\cdot\|n^*_{r,c}\|\cdot\|\bar{n}^w_{r,c}\|\cos\theta^*_{r,c} \\ = 2-2\cos\theta^*_{r,c} \\ n^*_{r,c}\ \|\ (n_{r,c}-\bar{n}^w_{r,c}) \end{cases} \quad \text{Equation (14)}$$

where $\|\cdot\|$ is the Euclidean norm, $n_{r,c}$ is an original normal vector of the pixel. In this example, $n^*_{r,c}$, $n_{r,c}$ and $\bar{n}^w_{r,c}$ are normalized using an Euclidean norm equals to 1.

a depth map with an enhanced surface may be reconstructed based on normal vectors with an existing method.

It is to be noted that the present disclosure is not limited to the specific details in the above examples.

Further, corresponding sharpening maps from the training data may further be used synthetically, and the synthetic sharpness map is used as a test input for surface enhancement.

According to an embodiment, the sharpening factor is determined based on K similar patches in the normal map of the blurred depth image and K corresponding patches in the normal map of the high-definition depth image using a K-nearest-neighbor (KNN) algorithm.

Figure 8:
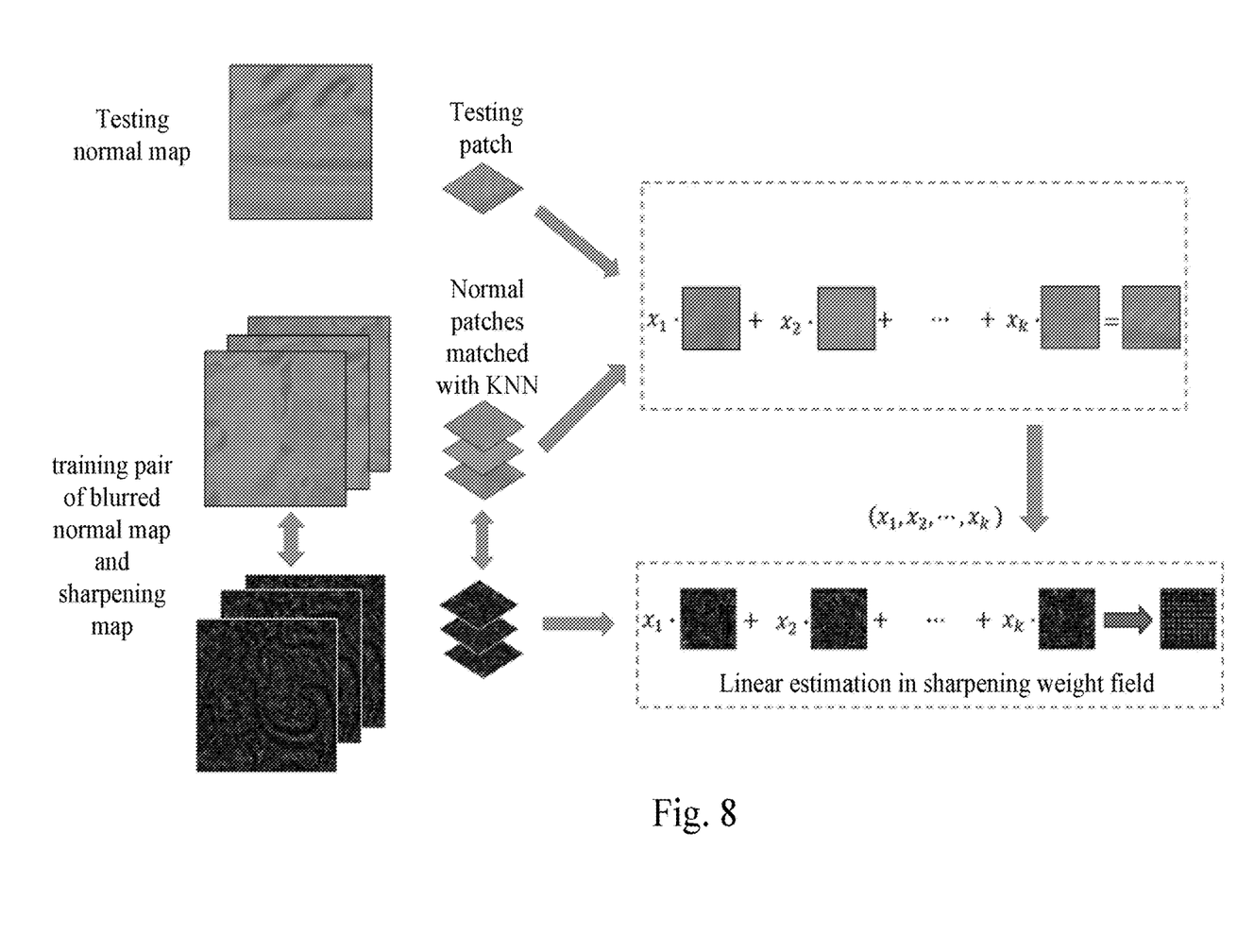
FIG. 8 is a schematic diagram illustrating a sharpness improving process based on training data according to an embodiment.

Next, a specific example manner for determining a sharpening factor using the KNN algorithm is described with reference to FIG. 8. The process is equivalent to estimating a sharpening map $X^*=\{\sigma^*_{i,j}\}$ for the testing normal map $N_{test}$. Given a training data set containing multiple normal map pairs $\langle N_{blur}, N_{clear}\rangle$, similar to the previous example, firstly, a sharpening map X is modeled for each of the pairs $\langle N_{blur}, N_{clear}\rangle$. Based on the training data set for X, the estimation of X* may be transformed into a synthesis problem based on the KNN method.

The process may be performed in the following manner. Firstly, for all of training pairs $\langle N_{blur}, X\rangle$, the testing normal maps $N_{test}$ and their expected sharpening maps X* are divided into M patches overlapping with one another, and the patches from $N_{test}$ and X* can be respectively denoted as $p_t(N_{test})$ and $p_t(X^*)$, where t=1, . . . ,M. Each of the normal patches $p_t(N_{test})$ is firstly fitted to K most similar patches in a training sample $[p_1(N_{blur}), \ldots, p_x(N_{blur})]$, and then a corresponding sharpening patch $p_t(X^*)$ is estimated, as shown in FIG. 8.

The sharpening map synthesis algorithm can be summarized as a second algorithm as follows.

For patch index t=1, . . . , M,

Step 1. for a testing normal patch $p_t(N_{test})$, finding its K nearest neighbors $p_k(N_{blur}) \in N_{blur}$, k=1, . . . , K;

Step 2. Calculating reconstruction weights of the K nearest neighbors, $$C_N = [w^p_1, \ldots, w^p_k],$$

which minimizes the reconstruction of $p_t(N_{test})$; and

Step 3. based on local geometry preserving, a sharpening patch $p_t(X^*)$ is estimated based on sharpening map patches $p_k(N_{blur})$ corresponding to the K nearest neighbors $p_k(N_{blur})$ and the reconstruction weights $w^p_k$, k=1, . . . , K.

In step 1, the nearest neighbors may be found using the Euclidean distance.

In step 2, the local reconstruction weight may be obtained by minimizing the following equation:

$$\varepsilon_t(w)=\|p_t(N_{test})-\Sigma_{k=1}^K w^p_k p_k(N_{blur})\|^2, \text{s.t.} \Sigma_{k=1}^K w^p_k=1 \quad \text{Equation (15)}$$

In step 3, the sharpening map patch $p_t(X^*)=\Sigma_{k=1}^K w^p_k p_k(X)$ may be estimated based on $w^p_k$ and K sharpening map patches $p_k(X)$ in X.

It is to be noted that the above examples are intended to be illustrative and not restrictive.

Figure 2:
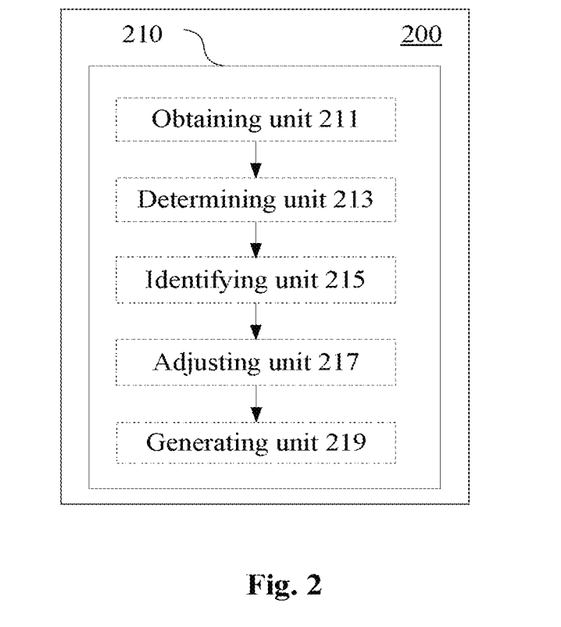
FIG. 2 is a block diagram illustrating a configuration example of an information processing apparatus according to another embodiment.

FIG. 2 shows a configuration example of an information processing apparatus according to another embodiment. An information processing apparatus 200 according to the present embodiment includes a processing circuitry 210. The processing circuitry 210 includes an obtaining unit 211, a determining unit 213, an identifying unit 215, an adjusting unit 217 and a generating unit 219. The obtaining unit 211, the determining unit 213, the identifying unit 215 and the adjusting unit 217 have the similar configurations to the obtaining unit 111, the determining unit 113, the identifying unit 115 and the adjusting unit 117 described with reference to FIG. 1, descriptions of which are omitted herein.

The generating unit 219 is configured to generate a depth map of an object based on an optimized normal map.

Corresponding to a process of obtaining the normal map based on the depth map, the depth map may be generated based on the normal map in a variety of known ways.

Figure 3:
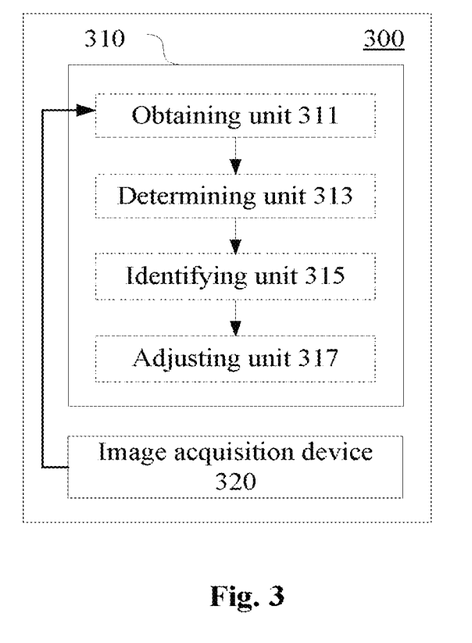
FIG. 3 is a block diagram illustrating a configuration example of an information processing apparatus according to yet another embodiment.

FIG. 3 shows a configuration example of an information processing apparatus according to yet another embodiment. An information processing apparatus 300 according to the present embodiment includes a processing circuitry 310 and an image acquisition device 320.

The processing circuitry 310 includes an obtaining unit 311, a determining unit 313, an identifying unit 315 and an adjusting unit 317, which respectively have similar configurations to the obtaining unit 111, the determining unit 113, the identifying unit 115 and the adjusting unit 117 described with reference to FIG. 1, and are not repeatedly described herein.

The image acquisition device 320 is configured to acquire a depth map of an object as depth data to be processed by the obtaining unit 311.

The image acquisition device 320 may include any existing apparatus capable of generating a depth image such as a depth sensor, for example, a Kinect sensor of the Microsoft corporation, a RealSense sensor of the Intel corporation and other mixed depth acquiring systems. Further, the image acquisition device 320 may also include an RGB-D data acquisition device including a depth image capturing device such as a depth sensor and an intensity image capturing device such as a color camera. Specifically, the color camera, for example, can acquire a sequence of continuous color images, and may be any one of cameras on the market. The depth sensor acquires a sequence of continuous depth maps, and may be structured light depth acquisition device such as the Kinect, or may be a ToF camera.

Figure 6:
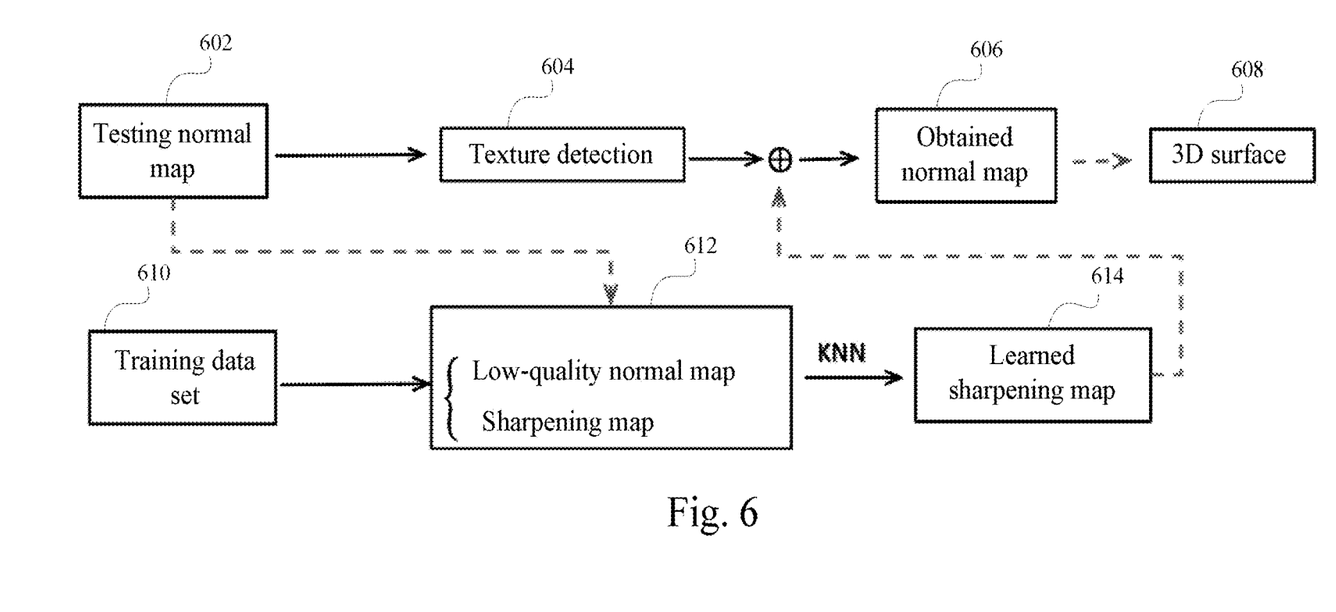
FIG. 6 is a schematic diagram illustrating an overall configuration of an exemplary embodiment according to the present disclosure.

Next, a general description of the above embodiments and specific examples according to the present disclosure are described with reference to FIGS. 6 and 7 to facilitate understanding of the exemplary embodiments of the present disclosure.

The image processing involved in the above embodiments and the specific examples generally relate to: defining a surface texture, modeling a sharpening map and performing a texture enhancement on a testing image. In the stage of defining the surface texture, input depth data is firstly converted to a normal angle space (602 in FIG. 6), so as to modify a surface detail without changing a shape. In the angle space, a concept of "angle profile" is proposed and a texture feature is further defined as that its angle profile can be fitted to a single-peak curve (FIG. 6, 604). In the modeling stage, low-quality and high-quality training pairs are subjected to a texture feature detection and matched to a single-peak angle profile (610, 612 in FIG. 6). For such a pair of calculated angle profiles, a sharpening weight is defined as a ratio of sharpness values of the respective single-peak profiles and the sharpening map is constructed using the calculated sharpening weight (the calculation of the sharpening map is referred to as a sharpening map modeling). In the testing stage, similarly, a texture feature of a testing low-quality normal map is detected and converted into an angle profile, and then a sharpening map is synthesized from a training data set using a KNN-based method (614 in FIG. 6). The obtained sharpening map is applied to guide texture enhancement processing (606 and 608 in FIG. 6).

Figure 7:
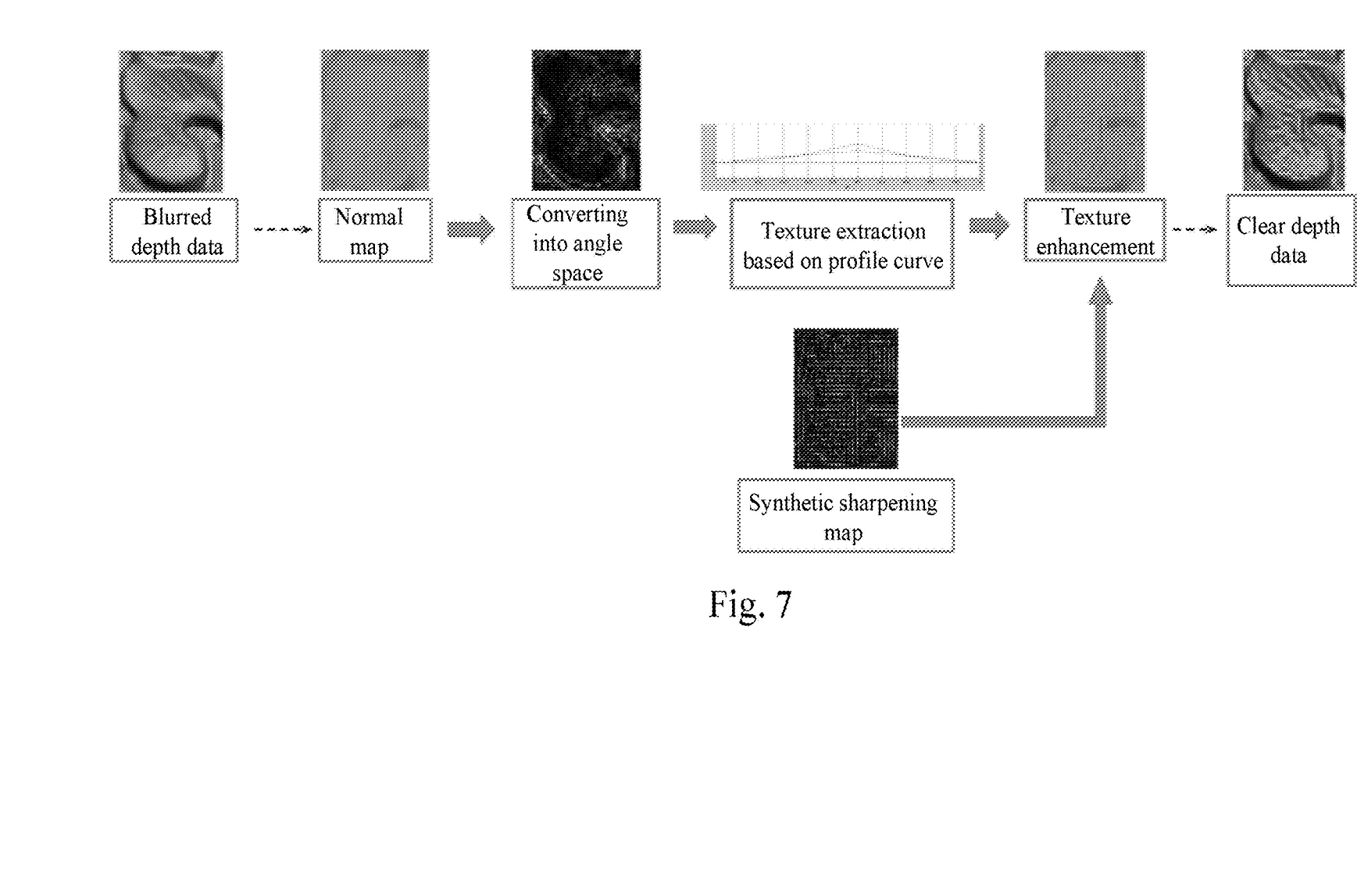
FIG. 7 is a schematic diagram illustrating an overall process of an exemplary embodiment according to the present disclosure.

A data converting process involved in the process is shown in FIG. 7.

Different from a texture mapping technology in which a given 2D texture image is pasted onto a 3D model, the texture enhancement processing according to the embodiment of the present disclosure detects an inherent 3D texture feature from input depth data and enhances the detected inherent 3D texture feature.

In the above description of the information processing apparatus according to the embodiments of the present disclosure, some methods and processes are also disclosed apparently. Next, an information processing method according to an embodiment of the present disclosure is described without repeating the specific details described in the above.

Figure 4:
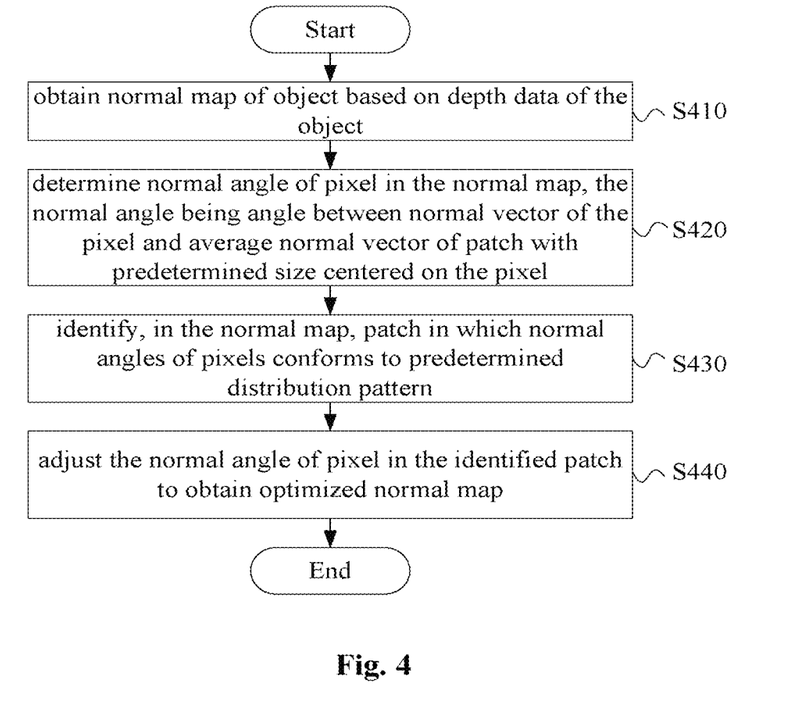
FIG. 4 is a flowchart illustrating a process example of an information processing method according to an embodiment of the present disclosure.

As shown in FIG. 4, an information processing method according to an embodiment includes the following steps.

In S410, a normal map of an object is obtained based on depth data of the object.

In S420, a normal angle of a pixel in the normal map is determined, wherein the normal angle being an angle between a normal vector of the pixel and an average normal vector of a patch with a predetermined size centered on the pixel.

In S430, the patch in which the normal angles of pixels conform to a predetermined distribution pattern is identified in the normal map.

The predetermined distribution pattern may include that values of the normal angles of the pixels arranged along a predetermined direction in the patch present a single-peak distribution.

In S440, the normal angle of a pixel in the identified patch is adjusted to obtain an optimized normal map.

The adjustment may include: adjusting the normal angle based on a sharpening factor determined based on a training image set containing a high-definition depth image and a corresponding blurred depth image.

Figure 5:
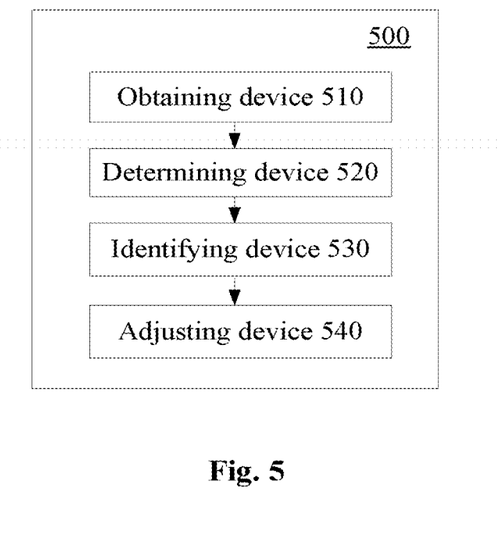
FIG. 5 is a block diagram illustrating a configuration example of an information processing apparatus according to another embodiment of the present disclosure.

In addition, FIG. 5 shows a configuration example of an information processing apparatus according to an embodiment. An information processing apparatus 500 includes: an obtaining unit 510 configured to obtain a normal map of an object based on depth data of the object; an determining device 520 configured to determine a normal angle of a pixel in the normal map, wherein the normal angle being an angle between a normal vector of the pixel and an average normal vector of a patch with a predetermined size centered on the pixel; an identifying device 530 configured to identify, in the normal map, the patch in which normal angles of pixels conform to a predetermined distribution pattern; and an adjusting device 540 configured to adjust the normal angle of a pixel in the identified patch to obtain the optimized normal map.

The information processing apparatus and information processing method according to the embodiments of the present disclosure may be used to process different types of depth degradations and may be applied to different scenarios. Some application examples are given hereinafter.

(1) 3D Surface Detail Enhancement

Given clear depth data and corresponding blurred depth data can be firstly converted into a pair formed by a normal map and a sharpening map, and then a patch extraction is performed with a certain overlapping region arranged between patches. Then, the above second algorithm may be used to obtain a sharpening map of given the testing blurred depth data. Finally, the enhanced normal map and clear depth data may be reconstructed using the above first algorithm.

(2) Depth Super-Resolution

Given low-resolution depth data and corresponding high-resolution depth data, the low-resolution depth data is firstly interpolated to be the same size as the high-resolution depth data, and then the data pair is converted to a sharpness map. A patch extraction is performed with a certain overlapping region arranged between patches. A sharpening map of a given testing blurred depth data can be obtained with the above second algorithm. Finally, the enhanced normal map and clear depth data can be reconstructed with the above first algorithm.

Figure 12:
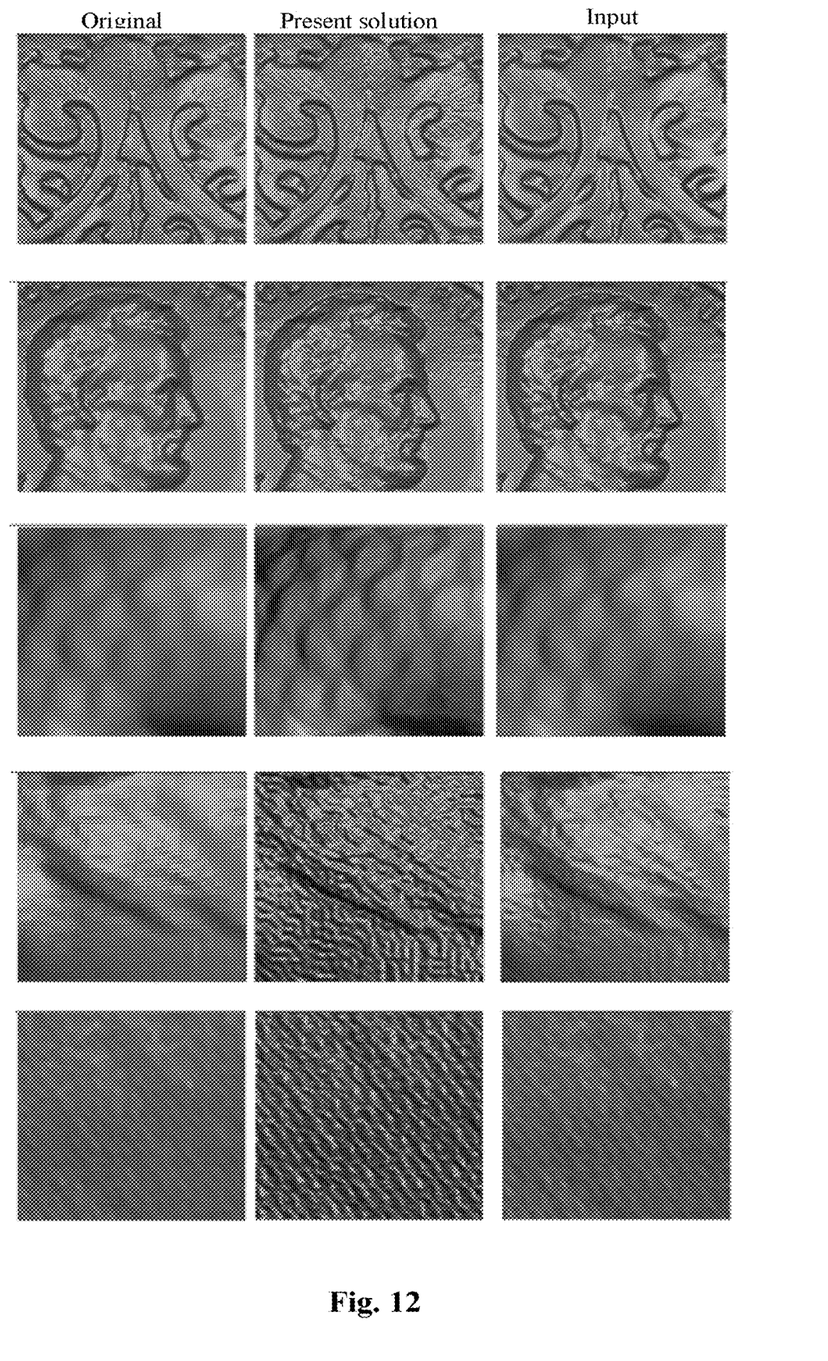
FIG. 12 illustrates an effect of a depth super-resolution as an application example of an embodiment according to the present disclosure.
Figure 13:
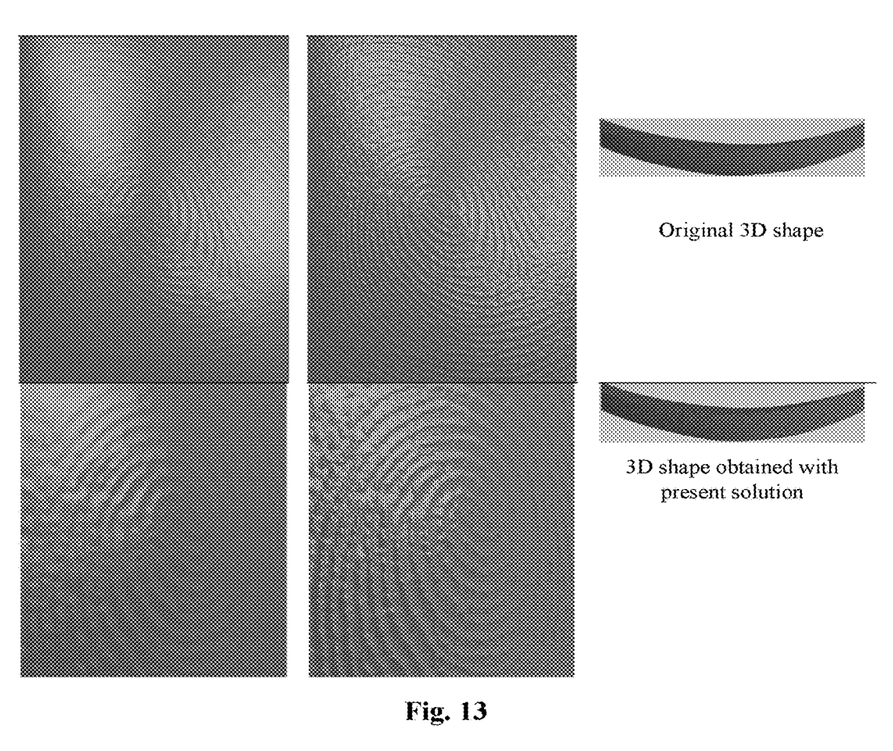
FIG. 13 illustrates an effect of 3D surface detail enhancement as an application example of an embodiment according to the present disclosure.

FIGS. 12 and 13 respectively show effect examples of depth super-resolution and 3D surface detail enhancement of image processing according to embodiments of the present disclosure.

In these examples, the size of the patch in the above second algorithm is set as 11×11, a pixel step in the patch extraction is 5, and the value of K for finding K similar neighbors is set as 25.

A left column in FIG. 12 shows original images with high-resolution, a middle column in FIG. 12 shows processing results according to an exemplary embodiment of the present disclosure, and a right column in FIG. 12 is blurred inputs.

In the example, the blurred input is obtained by performing a ⅓×⅓ down sampling on the original image and being interpolated to have the same resolution as the original image. An average filter size w is set as 3, a size of a fitting window $w_p$ for $\zeta_{r,c}$ is set as 3, and a fitting direction includes four directions of which the slopes are −1, 0, 1 and infinity, and the patch $p_{r,c}$ is extracted pixel by pixel.

A left column in FIG. 13 shows real depth maps obtained with the photometric stereo technology, a middle column shows optimized results obtained by image processing according to an embodiment of the present disclosure, and a right column shows an effect on a 3D shape.

In the example, normal data is obtained by real setting of photometric stereo, in which a process of calculating the normal data from the depth data (corresponding to the aforementioned equation (1)) is omitted. The average filter size is set as w=3 to calculate the normal angle in the aforementioned Equation (2), and the angle profile $\zeta_{r,c}$ is fitted to the patch $p_{r,c}$ along the four directions (of which the slopes are −1, 0, 1, and infinity) with $w_p$=3. The patch $p_{r,c}$ is extracted pixel by pixel. A texture is detected with the triangular model in Equation (7) and its sharpness o is obtained based on Equation (8).

As can be seen from the above examples, the surface detail can be enhanced while maintaining the shape according to the embodiments of the present disclosure.

As an example, each steps of the above method and each of constituent modules and/or units of the above apparatus may be realized by software, firmware, hardware, or a combination thereof. In the case where the present disclosure is realized by software or firmware, a program constituting the software is installed in a computer with a dedicated hardware structure (e.g. the general computer 1400 shown in FIG. 14) from a storage medium or network. The computer is capable of implementing various functions when installed with various programs.

Figure 14:
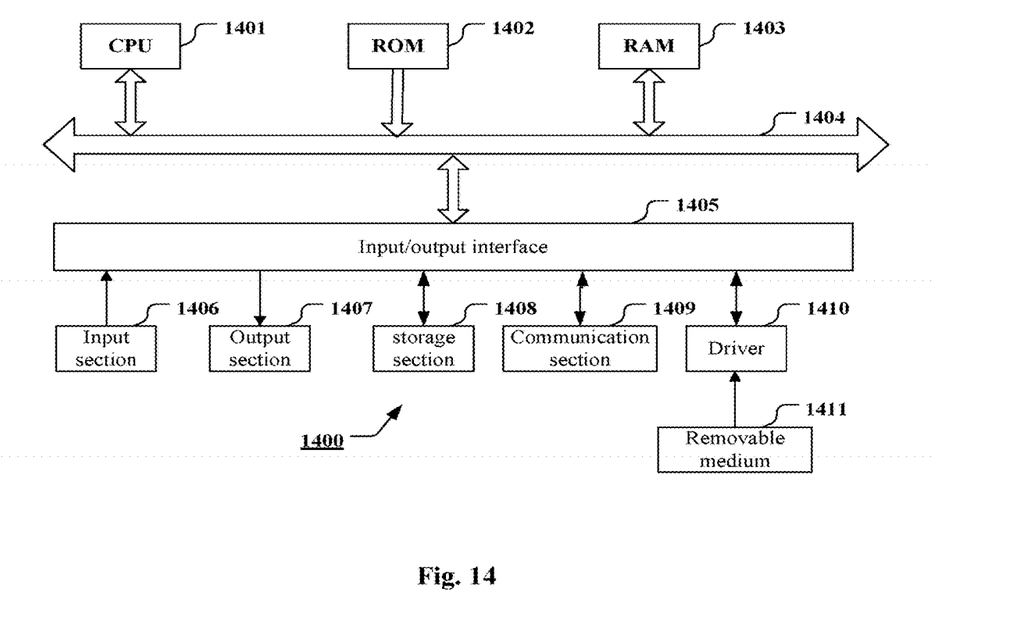
FIG. 14 is a block diagram illustrating an exemplary structure of a computer implementing a method and an apparatus according to the present disclosure.

In FIG. 14, a central processing unit (i.e., CPU) 1401 executes various processing according to a program stored in a Read Only Memory (ROM) 1402 or a program loaded to a Random Access Memory (RAM) 1403 from a storage section 1408. In the RAM 1403, data required for the various processing of the CPU 1401 may be stored as needed. The CPU 1401, the ROM 1402 and the RAM 1403 are connected to each other via a bus 1404. An input/output interface 1405 is also connected to the bus 1404.

The following components are connected to the input/output interface 1405: an input section 1406 (including a keyboard, a mouse and the like), an output section 1407 (including a display such as a Cathode Ray Tube (CRT) and a Liquid Crystal Display (LCD), a speaker and the like), the storage section 1408 (including a hard disk and the like), and a communication section 1409 (including a network interface card such as a LAN card, a modem and the like). The communication section 1409 performs communication processing via a network such as the Internet. If necessary, a drive 1410 may also be linked to the input/output interface 1405. A removable medium 1411 such as a magnetic disk, an optical disk, a magneto-optical disk, a semiconductor memory and the like may be installed in the driver 1410, so that the computer program read therefrom is installed in the storage section 1408 as appropriate.

If the foregoing series of processing above is implemented by software, a program constituting the software is installed from the network such as the Internet or a memory medium such as the removable medium 1411.

It should be understood by those skilled in the art that the memory medium is not limited to the removable medium 1411 shown in FIG. 14 in which the program is stored and which is distributed separately from the apparatus so as to provide the program to the user. The removable medium 1411, for example, may include a magnetic disk (including a Floppy Disk®), an optical disk (including a Compact Disk Read Only Memory (CD-ROM) and a Digital Versatile Disc (DVD)), a magneto-optical disk (including a MiniDisc (MD)®), and a semiconductor memory. Alternatively, the memory medium may be the hard discs included in ROM 1402 and the storage section 1408 in which programs are stored, and can be distributed to users along with the device in which they are incorporated.

A program product stored with machine-readable instruction codes is further provided according to an embodiment of the present disclosure. When reading and executing the instruction codes, a machine can execute the above method according to the embodiment of the present disclosure.

Accordingly, a memory medium for carrying the program product including machine-readable instructions is covered in the present disclosure. The memory medium includes but is not limited to floppy diskette, optical disk, magneto-optical disk, memory card, memory stick and on the like.

In the above description of specific embodiments of the present disclosure, the features described and/or illustrated with respect to one embodiment may be used in one or more other embodiments in the same way or in a similar way, in combination with features in other embodiments, or instead of the features in other embodiments.

It is to be emphasized that the term "comprising/including" when used herein is taken to specify the presence of features, elements, steps or components, but does not exclude the presence or addition of one or more other features, elements, steps or components.

In the above embodiments and examples, reference numerals consist of numerals are used to represent steps and/or units. It should be understood by those skilled in the art that these reference numerals are only for a convenient description and drawing, and are not intended to represent an order of the steps and units or to represent any other constraint.

In addition, the method according to the present disclosure is not limited to be executed in a time sequence described in the specification, and may be executed in other time-sequencing, parallel, or separately. Therefore, the execution order of the method described in the specification is not intended to be limiting.

Although the present disclosure has been described above with respect to specific embodiments thereof, it is to be understood that all of the above embodiments and examples are illustrative and not restrictive. Those skilled in the art will appreciate that various modifications, improvements and substitutions are possible, without departing from the scope and spirit of the invention as disclosed in the accompanying claims. And these modifications, improvements or substitutions are intended to be included within the protection scope of the present disclosure.

The invention claimed is:

1. An information processing apparatus, comprising:
processing circuitry configured to
obtain a normal map of an object based on depth data of the object;
determine a normal angle of a pixel in the normal map, wherein the normal angle is an angle between a normal vector of the pixel and an average normal vector of a patch with a predetermined size centered on the pixel;
identify, in the normal map, a patch in which normal angles of pixels conform to a predetermined distribution pattern; and
adjust the normal angle of a pixel in the identified patch to obtain an optimized normal map,
wherein the predetermined distribution pattern comprises values of the normal angles of pixels arranged along a predetermined direction in the patch present a single-peak distribution.

2. The information processing apparatus according to claim 1, wherein a peak of the single-peak distribution is at the center of the patch.

3. The information processing apparatus according to claim 1, wherein the predetermined direction comprises a horizontal direction, a vertical direction or a diagonal direction.

4. The information processing apparatus according to claim 1, wherein the adjusting comprises:
adjusting the normal angles of the pixels arranged along the predetermined direction while maintaining an area under curve of the single-peak distribution.

5. The information processing apparatus according to claim 1, wherein the predetermined size comprises 3×3 pixels or 5×5 pixels.

6. The information processing apparatus according to claim 1, wherein the adjusting comprises:
determining a sharpening factor based on a training image set containing a high-definition depth image and a corresponding blurred depth image; and
adjusting the normal angle based on the determined sharpening factor.

7. The information processing apparatus according to claim 6, wherein
the predetermined distribution pattern comprises values of the normal angles of pixels arranged along a predetermined direction in the patch present a single-peak distribution; and
the sharpening factor comprises a scaling factor for a height-width ratio of the single-peak distribution.

8. The information processing apparatus according to claim 6, wherein determining the sharpening factor comprises:
determining, for the identified patch, a similar patch in a normal map of the blurred depth image; and
determining the sharpening factor based on a distribution of normal angles in the similar patch and a distribution of normal angles in a corresponding patch in a normal map of the high-definition depth image.

9. The information processing apparatus according to claim 8, wherein the sharpening factor is determined based on K similar patches in the normal map of the blurred depth image and K corresponding patches in the normal map of the high-definition depth image, by using a K-nearest-neighbor algorithm.

10. The information processing apparatus according to claim 6, wherein the high-definition depth image and the corresponding blurred depth image are obtained by:
for a given low-resolution depth image and a corresponding first high-resolution depth image, converting, by interpolation, the low-resolution depth image into a second high-resolution depth image having a resolution same as the first high-resolution depth image; and
taking the first high-resolution depth image and the second high-resolution depth image as the high-definition depth image and the blurred depth image, respectively.

11. The information processing apparatus according to claim 1, wherein the depth data comprises mesh data, a point cloud, a depth map or a normal map.

12. The information processing apparatus according to claim 1, wherein the processing circuitry is further configured to:
generate a depth map of the object based on the optimized normal map.

13. The information processing apparatus according to claim 1, further comprising:
an image acquisition device configured to acquire a depth map of the object as the depth data.

14. An information processing method, comprising:
obtaining a normal map of an object based on depth data of the object;
determining a normal angle of a pixel in the normal map, wherein the normal angle is an angle between a normal vector of the pixel and an average normal vector of a patch with a predetermined size centered on the pixel;
identifying, in the normal map, a patch in which normal angles of pixels conform to a predetermined distribution pattern; and
adjusting the normal angle of a pixel in the identified patch to obtain an optimized normal map,
wherein the predetermined distribution pattern comprises: values of the normal angles of pixels arranged along a predetermined direction in the patch present a single-peak distribution.

15. An information processing method, comprising:
obtaining a normal map of an object based on depth data of the object;
determining a normal angle of a pixel in the normal map, wherein the normal angle is an angle between a normal vector of the pixel and an average normal vector of a patch with a predetermined size centered on the pixel;
identifying, in the normal map, a patch in which normal angles of pixels conform to a predetermined distribution pattern; and adjusting the normal angle of a pixel in the identified patch to obtain an optimized normal map,
wherein the adjusting comprises: adjusting the normal angle based on a sharpening factor determined based on a training image set containing a high-definition depth image and a corresponding blurred depth image.

* * * * *